Nov. 22, 1955 J. W. BALLARD ET AL 2,724,411
VARIABLE SURGE CHAMBER AND/OR ACCUMULATOR
Filed Feb. 24, 1953 2 Sheets-Sheet 2
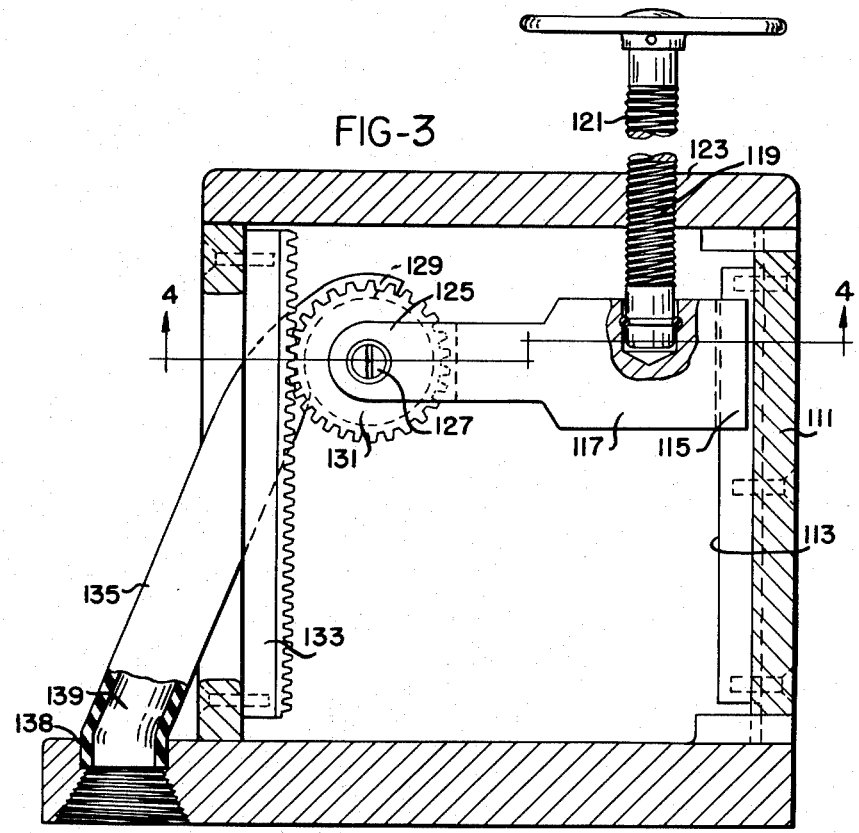
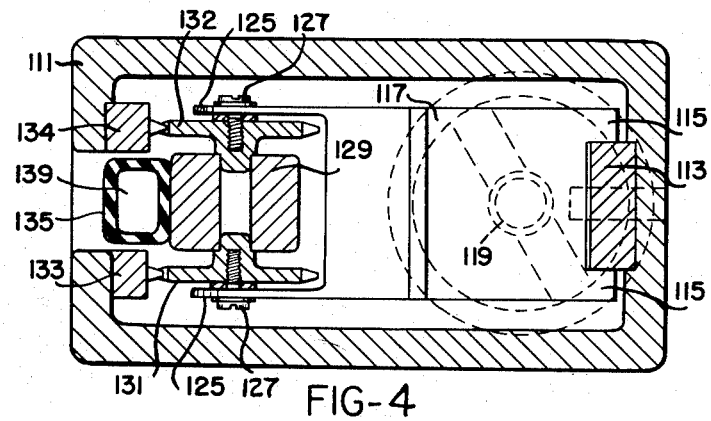
INVENTOR.
JAMES W. BALLARD
HYMAN BRIER
BY
ATTORNEYS

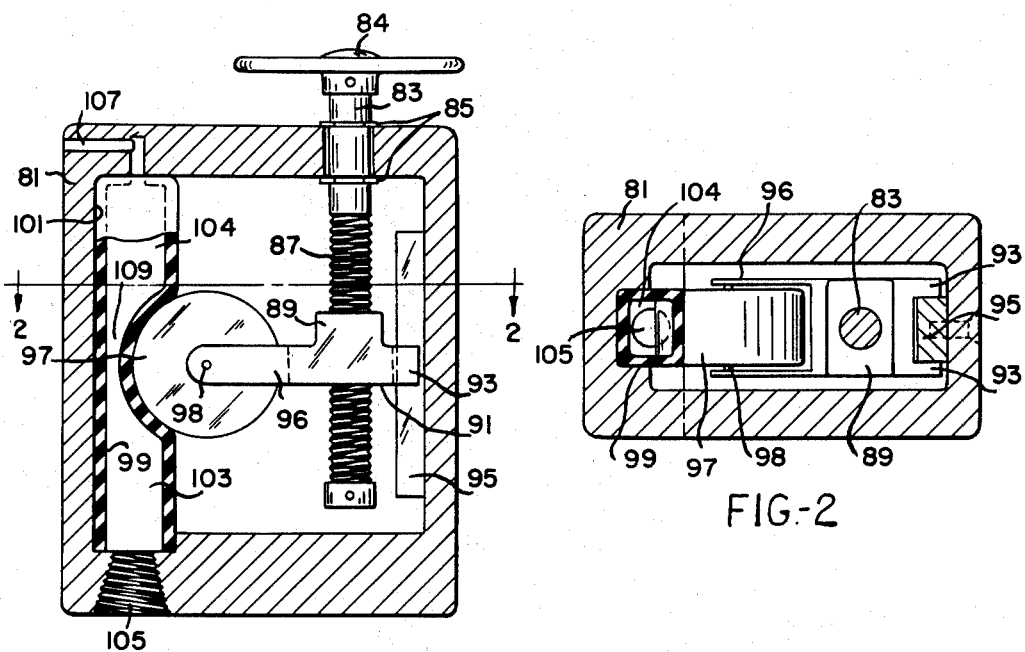

2,724,411

VARIABLE SURGE CHAMBER AND/OR ACCUMULATOR

James W. Ballard and Hyman Brier, Dayton, Ohio, assignors to The Commonwealth Engineering Company of Ohio, Dayton, Ohio, a corporation of Ohio Application February 24, 1953, Serial No. 338,382

5 Claims. (Cl. 138—30)

This invention relates to devices for regulating characteristics of fluid flow and is particularly directed to structures which regulate the vibratory effects within the fluid system.

Fluid flow systems similarly to electrical systems exhibit properties of resistance, capacitance and inertance (inductance). While in any given fluid flow the resistance may partially be disregarded, the capacitance and inertance effects and the relative values thereof control the period of vibrations of the fluid of the system.

Inertance is a function of such elements as orifices, valves and reducers and is susceptible of quick and accurate control only with some difficulty. The capacitive property however is readily subject to variation and affords a means of fluid control either to induce or repress vibration action in the system.

It is accordingly within the contemplation of this invention to provide novel means for the control of the characteristics of fluid flow systems, which means are actuable primarily to effect variations in the capacitance of the system.

It is also within the contemplation of this invention to provide an accumulator or surge chamber means for the control of the characteristics of a fluid system, which means are actuable to induce inductive as well as capacitative effects into the system.

The various embodiments of the invention described hereinafter incorporate a resilient deformable body which defines a chamber and is connectible into a fluid flow system; means are provided for progressively resiliently deforming this body and for securing the body in a deformed state.

The deformation action occasions a change in the volumetric capacity and accordingly the capacitance of the chamber and of the system as a whole. Thereby it becomes possible to either set up or repress the wave motion characteristics of fluid flowing in the system. For example, where a system is normally subject to flow vibrations which cause excessive and undesirable vibration effects, the introduction of the unit of invention into the system facilitates removal of the objectionable vibratory features of the system.

The change in capacitance in some of the hereinafter described embodiments is accompanied by a change in the inductive characteristics of the system and the quantitative relationship of the inductive change to the capacitance change may be controlled by selecting the tubular, resilient and deformable body in a manner which will become apparent as the description of the invention proceeds.

The foregoing objects and the structural mode of operation will become more apparent from the following detailed description and accompanying drawings wherein:

Figure 1 is a cross-sectional view of one embodiment of the invention;

Figure 2 is a view taken on line 2—2 of Figure 1;

Figure 3 is an elevational view partly in section of a further embodiment of the invention; and Figure 4 is a view taken on line 4—4 of Figure 3.

Referring to the drawings Figures 1 and 2 illustrate an embodiment of the invention in which housing 81 having a shaft 83 rotatably mounted in an upper portion thereof and fixed against rectilineal movement at 85 is provided with an externally screw thread 87 and passes through a nut 89 mounted on a support 91.

The support 91 at one end thereof is provided with side guides 93 which pass over a way 95. The other end of the support 91 is provided with spaced arms 96 between which there is journaled a steel roller 97 on pin 98. The steel roller compressively engages an elongated resiliently deformable plastic tubing 99 which is fixedly secured to wall 101 of the housing 81. The tubing 99 defines an interior chamber having a lower spacing 103 and an upper spacing 104 connected by a constricted passage 109 occasioned by the pressured engagement of the roller 97 with the body 99.

The housing 81 is provided with a port 105 which opens into the spacing 103, while the upper end of the housing is provided with a passage 107 extending from the upper spacing 104 to a drain line or where desired to a return line to the system.

In the operation of the structure just described the hand wheel 84 rotates the shaft 83 in the housing 81 and causes the nut 89 and support 91 to travel over the way 95 carrying with it the roller 97. This arrangement permits the capacity of the spacings 103 and 104 and hence the characteristics of the tubing 99 to be varied.

In the structure shown in Figures 3 and 4 a housing 111 is provided with a way 113 which is engaged by guides 115 of a support 117. A shaft 119 is journaled for rotation in the support 117 and the shaft is externally threaded at 121 to engage the housing 111 at 123. Support 117 is provided at an end thereof with spaced arms 125 through which pins 127 extend; spaced pinions 131 and 132 having therebetween a roller 129 are mounted on the pins 127 for rotation. Pinion 131 engages a rack 133 while pinion 132 engages a rack 134, the racks being mounted in the side wall of the housing 111.

Secured to the foot of the housing at 138 and extending upwardly therefrom is a resiliently extensible tubular body 135 defining a chamber 139 and the upper end of this tubular body is secured about the roller 129.

In the operation of the structure shown in Figures 3 and 4 rotation of the shaft 119 causes the same to move through the upper portion of the housing at 123, occasioning a rectilineal movement of the support 117. Upon movement of the support the pinions 131 and 132 which are in engagement with the fixed racks 133 and 134 rotate and cause the roller 129 to rotate, thereby changing the length of the winding 135 of the body on the roller. This latter effect is facilitated by the rectilineal motion of the roller 129 with the support 117 and the capacity of the chamber 139 is effectively changeable thereby.

It will be understood that this invention is susceptible to modification in order to adapt it to different usages and conditions and accordingly, it is desired to comprehend such modifications within this invention as may fall within the scope of the appended claims.

We claim:

1. An accumulator for hydraulic systems comprising a housing, an elongated, resiliently deformable tubular body having at least a portion thereof in said housing and defining a chamber, and roller means in said housing engaging a portion of the length of said elongated body and actuable to pressurably deform the same.

2. An accumulator for hydraulic systems comprising a housing, an elongated, resiliently deformable extensible tubular body having a portion thereof in said housing defining a chamber, and roller means secured to said body actuable to cause resilient extension of the same to deform the body and vary the volumetric capacity thereof.

3. An accumulator for hydraulic systems comprising a housing, an elongated, resiliently deformable extensible tubular body in said housing defining a chamber, roller means supported in said housing and having a length of said elongated tubular body secured thereabout, said roller means being rotatably actuable to vary the length of said body thereon to thereby vary the volumetric capacity of said body.

4. An accumulator for hydraulic systems comprising a housing, an elongated, resiliently deformable, extensible tubular body in said housing defining a chamber, a roller supported in said housing in contact with said deformable body and rectilineally movable, a rack and pinion supported in said housing, said pinion being in driving engagement with said roller, and means to move said pinion over said rack to change the effective length of said chamber by progressively deforming the upper end of said chamber by winding it on said roller.

5. An accumulator for hydraulic systems comprising a housing, an elongated, resiliently deformable, extensible tubular body in said housing defining a chamber, a roller supported in said housing in contact with said deformable body and rectilineally movable, a support guided for rectilineal movement, a pinion on said support, said pinion being in driving engagement with said roller, a rack engaging with said pinion, and means to move said support and pinion with respect to said rack to impart movement to said pinion and roller whereby the tubular body is wound on said roller to progressively deform the same in the movement of said support.

References Cited in the file of this patent

UNITED STATES PATENTS

| | | |
|---|---|---|
| 977,044 | Rebourg | Nov. 29, 1910 |
| 1,108,128 | Buffum | Aug. 25, 1914 |
| 1,977,504 | Brown | Oct. 16, 1934 |
| 2,422,921 | Nier et al. | June 24, 1947 |
| 2,432,082 | Bilyeu | Dec. 9, 1947 |
| 2,434,835 | Colley | Jan. 20, 1948 |
| 2,516,029 | Swindin | July 18, 1950 |
| 2,590,215 | Sausa | Mar. 25, 1952 |

FOREIGN PATENTS

| | | |
|---|---|---|
| 16,321 | Great Britain | of 1908 |
| 521,820 | Germany | Mar. 12, 1931 |
| 626,755 | Germany | Feb. 17, 1936 |